(12) United States Patent
Yoder et al.

(10) Patent No.: US 9,301,492 B1
(45) Date of Patent: Apr. 5, 2016

(54) METHOD OF MAKING CLUMPING CELLULOSIC ANIMAL LITTER

(71) Applicant: Kadant GranTek Inc., Green Bay, WI (US)

(72) Inventors: Ricky L. Yoder, Casco, WI (US); Robert V. Wiedenhaft, Green Bay, WI (US)

(73) Assignee: KADANT GRANTEK INC., Green Bay, WI (US)

(*) Notice: Subject to any disclaimer, the term of this patent is extended or adjusted under 35 U.S.C. 154(b) by 32 days.

(21) Appl. No.: 14/204,961

(22) Filed: Mar. 11, 2014

Related U.S. Application Data

(60) Provisional application No. 61/791,563, filed on Mar. 15, 2013.

(51) Int. Cl.
  *A01K 1/015* (2006.01)
(52) U.S. Cl.
  CPC .................................... *A01K 1/0155* (2013.01)

(58) Field of Classification Search
  CPC .. A01K 1/0155; A01K 1/0152; A01K 1/0154
  USPC .......................................................... 119/172
  See application file for complete search history.

(56) References Cited

U.S. PATENT DOCUMENTS

| | | | |
|---|---|---|---|
| 6,662,749 B1 * | 12/2003 | Wiedenhaft | 119/172 |
| 7,124,710 B2 * | 10/2006 | Weaver | 119/171 |
| 2010/0136128 A1 * | 6/2010 | Hurwitz et al. | 424/499 |
| 2011/0056440 A1 * | 3/2011 | Burckbuchler, Jr. | 119/171 |

* cited by examiner

*Primary Examiner* — Monica Williams
*Assistant Examiner* — Aaron Rodziwicz
(74) *Attorney, Agent, or Firm* — Michael Best & Friedrich LLP

(57) ABSTRACT

A method of making a clumping cellulosic animal litter with enhanced clumping rate and improved flushability when spent using cellulosic granules to about 1%-5% by weight of an inner coating of a polyacrylate is first applied and then to which about 1%-4% by weight based on the weight of the granules of an outer coating of guar gum and/or guar gum substitute is applied.

19 Claims, No Drawings

METHOD OF MAKING CLUMPING CELLULOSIC ANIMAL LITTER

CROSS-REFERENCE TO RELATED PATENT APPLICATIONS

This patent application claims the benefit of U.S. Provisional Patent Application No. 61/791,563 filed Mar. 15, 2013.

FIELD

This invention pertains to a method of making clumping cellulosic animal litter.

BACKGROUND

Embodiments of this invention relate generally to methods of making cellulosic animal litters and, more particularly, to methods of making clumping cellulosic animal litters.

Small domesticated animals, such as cats, are often trained to urinate and defecate in special containers commonly referred to as litter boxes. Untrained caged animals, such as guinea pigs, hamsters, gerbils, dogs, birds, monkeys, ferrets and laboratory mice and rats urinate and defecate on the floors of their cages. Therefore, pet owners, veterinarians and laboratory personnel line the bottoms of litter boxes and cages with absorbent material to collect the animals' urine and feces. In order to control objectionable odors from the contaminated absorbent material, it is necessary to periodically remove and dispose of that material and to replace it with fresh absorbent material.

Until recently, it was found to be necessary to completely remove contaminated absorbent material from the litter boxes and cages in order to control objectionable odors. However, clay-based absorbent materials have been developed which, when wetted with animal urine, form coherent clumps that may be easily segregated and removed from the remaining uncontaminated absorbent material. These clay-based absorbents, which are generally referred to as "clumping litters", are more efficient and convenient to use than prior absorbent materials. As a result, they have gained widespread commercial acceptance.

Unfortunately, clay-based absorbents have drawbacks. First, they are dusty. Second, clump formation in clay-based clumping litters is often not as rapid as be desired. Also, the clumps formed are often soft and friable, which can complicate their removal. Additionally, clay-based clumping litters are relatively expensive since they require that the clay be mined, processed, and often shipped long distances before being used to make clumping litters. The mining process is not only expensive, it can scar the landscape and is therefore environmentally undesirable.

Substrates containing at least 10% by weight cellulosic content are a known alternative to straight clay-based absorbents for use in absorbing and disposing of animal urine and feces. When such cellulosic materials are made from waste produced in paper manufacture, they offer significant advantages over clay-based absorbents. First, the starting material is very inexpensive. Second, it is plentifully available and, once used and disposed of the cellulosic component readily degrades, reducing disposal problems inherent in the use of clay-based absorbents. Some particularly desirable methods of making cellulosic granules or particles from paper waste are described in U.S. Pat. Nos. 4,560,527, 4,619,862, 4,621,011, and 4,721,059, the disclosures of which are incorporated herein by reference.

Although untreated cellulosic granules may form friable clumps, until the advent of the present embodiments, the only practical methods for making reliable and efficient clumping cellulosic absorbents are described in U.S. Pat. Nos. 5,970,916 and 6,662,749 to the present inventors. Although the clumping cellulosic litters of the '916 and '749 patents work well, it is desirable to improve the methods for making clumping cellulosic litters in accordance with the '749 patent.

SUMMARY

The present embodiments represent a substantial advance in the process for making clumping cellulosic absorbents comprising coated cellulosic granules having a first or inner coating of a dual adhesive/surface active agent and a second coating of guar gum or guar gum substitute. The granules may also have a third outer aqueous adjunct coating containing at least an odor control agent and optionally one or more other ingredients as discussed below. The dual adhesive/surface active agent in the clumping cellulosic absorbents must be: 1) water soluble, 2) capable of penetrating and drying into the particulate cellulosic absorbents, 3) capable of adhering to guar gum or a guar gum substitute, and 4) capable of being readily re-solubilized when the granule is wetted with urine. When a guar gum substitute is used, it must provide clumping commensurate with that achieved with guar gum without causing the clumps to "puddle" or become a sticky mass. If a guar gum substitute is used, it must also be a guar gum substitute that will not produce a wet or sticky surface on the coated cellulosic granules.

The Particulate Cellulosic Substrate

The particulate cellulosic substrate may be prepared from plant fiber such as fiber from trees and plants, sugar beets, sugar cane, citrus pulp, potatoes, grains, peanut hulls, corn cob, tobacco stems, apple pumice, natural grasses, cotton, peat, etc. Preferably, it will be derived from wood pulp, citrus pulp, sugar cane, primary paper sludge, or a combination of primary and secondary paper sludge. In all cases, the granules should be no greater than about 4 mesh and preferably will be in the range of about 4 to 60 mesh. Granules in the range of about 12-20 mesh are particularly preferred when the absorbents are to be used with small animals such as cats, since granules in this size range reduce tracking from the litter box. The lengths of the cellulose fibers preferably will be less than about 10 mm, more preferably will be less than about 1 mm and most preferably will be less than about 0.3 mm.

Although agglomerated granules are particularly preferred, the cellulosic material may be in granular, pellet or other forms. Desirable methods of forming or agglomerating cellulosic granules are described in U.S. Pat. Nos. 5,560,527, 4,619,862, 4,621,011, 4,721,059, and 5,019,564 which are incorporated herein by reference. Substrates containing at least 10% by weight cellulosic content are referred to as "cellulosic granules". However, it is preferred that the cellulosic contain at least 40% by weight cellulosic content and most preferably at least 50% by weight cellulosic content.

A particularly suitable agglomerated cellulosic granule made from primary and secondary sludge generated in the manufacture of virgin and recycled paper is available from Kadant GranTek, Inc. of Green Bay, Wis. under the trademark BIODAC®. BIODAC® granules comprise a cellulose complex consisting of about 47-53% by weight paper fiber, about 28-34% by weight of kaolin clay and about 14-20% by weight calcium carbonate, as well as minor amounts (less than about 1%) of titanium dioxide. BIODAC® granules are available in a variety of different mesh size ranges including 4/20, 8/30, 12/20, 16/30, and 20/50. Typical properties of these products are as follows:

| BIODAC GRANULES ® | BULK DENSITY | MOISTURE CONTENT | pH | LIQUID HOLDING CAPACITY | SCREEN ANALYSIS |
|---|---|---|---|---|---|
| 4/20 | 41.0 ± 3.0 lbs/cft | less than 5% | 7.0-8.0% | 16-20% | +4 mesh < 5.0%<br>4-20 mesh < 90%<br>−30 mesh < 1.0% |
| 8/30 | 41.0 ± 3.0 lbs/cft | less than 5% | 7.0-8.0% | 16-20% | +6 mesh < 1.0%<br>8-30 mesh < 90%<br>−40 mesh < 1.0% |
| 12/20 | 42.0 ± 3.0 lbs/cft | less than 5% | 7.0-8.0% | 16-20% | +10 mesh < 1.0%<br>12-20 mesh < 80%<br>−40 mesh < 1.0% |
| 16/30 | 43.0 ± 3.0 lbs/cft | less than 5% | 7.0-8.0% | 16-20% | +14 mesh < 1.0%<br>16-30 mesh < 90%<br>−40 mesh < 1.0% |
| 20/50 | 45.0 ± 3.0 lbs/cft | less than 5% | 7.0-8.0% | 16-20% | +16 mesh < 1.0%<br>20-50 mesh < 90%<br>−60 mesh < 1.0% |

Dual Adhesive/Surface Active Agent

Polyacrylates that satisfy the requirements of the dual adhesive/surface active agent will be described below. Since the properties of polyacrylates in respect of these properties is not strictly predictable, it is expected that other polyacrylates as well as acrylate copolymers (e.g., methyl methacrylate) could also be used. Such acrylates and polyacrylates will have to be identified by routine testing against the above criteria, performed by those of ordinary skill in the polymer art.

The polyacrylates already known to perform as a dual adhesive/surface active agent will have an average molecular weight of about 1000 to 5000, with an average molecular weight of about 2000 to 4000 being preferred, and an average molecular weight of about 2000 to 3000 presently being most preferred. A specific polyacrylate that has been found to be particularly useful as a dual adhesive/surface active agent is sold under the designation Spinks 105 by H.C. Spinks Clay Company, Inc., of Paris, Tenn. Spinks 105 is an aqueous sodium polyacrylate solution. It is a clear, amber fluid, with a solids content (% by weight, dry 0.6 gram at 150.degree. C. for 60 minutes in a forced draft oven) of 43.0-45.0, a pH (ASTM E-70) of 7.00-8.00, and a viscosity (as shipped, cps Brookfield LV spindle #2, 30 rpm, 25.degree. C.) of 100-500. Spinks 105 has an average molecular weight of about 2000-3000.

Guar Gum and Guar Gum Substitutes

Any commercially available guar gum or guar gum substitute (referred to below collectively as "guar gum" or "guar") may be used. The guar gum is preferably in the form of a powder of less than about 80 mesh in size and preferably less than about 200 mesh in size.

Some or all of the guar may be replaced by a suitable guar substitute in the form of an animal-safe blend of water-soluble natural gums designed to provide the desired guar gum properties or, alternatively, carboxymethylcellulose. One useful commercially available blend of water-soluble natural gums that can be used in lieu of guar gum is Stabilizer GR-590 which is available from Colony Gums of Monroe, N.C.

Aqueous Adjunct

The aqueous adjunct will contain an aqueous mixture, solution or suspension of an odor control agent which is an anti-microbial and/or a fragrance. It also may contain one or more of a biocide, a coloring agent (pigment or dye), a urinase inhibitor, and a surfactant.

The Improved Clumping Treatment Method

In present embodiments the order of the application of the dual adhesive/surface active agent, guar gum/guar gum substitutes and aqueous adjunct to the cellulosic granules substrate is critical.

In the process described in our U.S. Pat. No. 6,662,749, when aqueous adjuncts are used, they are applied first to the granules. Only after this step is completed, are the granules coated with the dual adhesive/surface active agent followed by the guar, drying and curing before packaging.

It has been discovered that, surprisingly, if the order of coating application steps is altered by applying the aqueous adjunct following the application of the guar/guar substitute, significant and unexpected advantages can be obtained. This change in the process order results in a cellulosic animal litter with enhanced clumping rate and improved flushability of spent clumping litter. Also, with this change in the order of coating application, the level of guar (or guar substitute) required unexpectedly is also reduced from that taught in the '749 patent (about 1% to 7% by weight) to about 1-4% by weight and more preferably to about 1.5-3% by weight.

The coating steps may be carried out, for example, using a drum coating device, such as a cement mixer or a horizontal coating drum, an auger mixer, a fluid bed mixer, a spray tower, a vibrating bed mixer, or other similar device known to those skilled in the coating arts. The use of an auger mixer is presently preferred. Also, both batch and continuous feed systems may be used. Continuous systems are also currently preferred.

The coating steps of current embodiments therefore proceed as set forth below.

1. Apply Aqueous Adjunct

The amount of aqueous adjunct applied must be no greater than that which would bring the total moisture in the final coated granules to 5% or less by weight. Preferably, the amount of aqueous adjunct applied will be no greater than that which would bring the total moisture in the granules to 3.5% by weight and most preferably to 3.0% by weight. Limiting the amount of aqueous adjunct (and hence total moisture in the final granules) unexpectedly helps achieve the desirable clumping properties and, most importantly, makes it possible to eliminate the drying and curing steps required in the prior process of the '749 patent. This is significant because it saves time, fuel and money, yet results in a superior end product.

2. Apply Dual Adhesive/Surface Active Agent

The amount of dual adhesive/surface active agent used will be at least an amount sufficient to coat 50% of the surface of the granules and no more than the amount capable of being absorbed by the granule. Preferably, the dual adhesive/surface active agent will be present in an amount that primarily coats and only minimally penetrates into the granules. The actual solids level will be limited by viscosity—a solids level that would interfere with efficient handling of the material should be avoided. Otherwise, the solids level should be chosen to supply a sufficient amount of the dual adhesive/surface active agent to bind the guar or guar substitute coating.

In a preferred embodiment where the 2000-3000 molecular weight polyacrylate (e.g., Spinks 105) is used in an aqueous solution, the dual adhesive/surface active agent will be used at a concentration level of about 43%-45% by weight solids, assuming that the guar is present in the preferred range set out below. This will amount to about 1% to 5% by weight of the solution, based on the weight of the granules.

3. Guar Gum or Guar Gum Substitute

The application of the guar or guar substitute will be undertaken after the dual adhesive is coated onto the granules. It is not necessary to coat all of the cellulosic granules in order to achieve the near instantaneous clumping made possible by the present embodiments. Indeed, while it is preferred that up to 100% of the granules are coated, as little as 25% by weight of the granules may be coated and preferably at least about 50% to 75% by weight of the granules will be coated to achieve the unique animal litter properties of the end product.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the embodiments of the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. A method of making a clumping cellulosic animal litter of coated cellulosic granules with enhanced clumping characteristics comprising:
   providing a plurality of cellulosic granules;
   first applying about 1%-5% by weight based on the weight of the granules of a coating of a dual adhesive/surface active agent in which the dual adhesive/surface active agent is a polyacrylate with an average molecular weight of about 1000 to 5000;
   second applying a coating of about 1%-4% by weight based on the weight of the granules of guar gum; and
   then applying an aqueous adjunct of an aqueous mixture, solution or suspension of an odor control agent in an amount no greater than that which will bring the total moisture of the final coated cellulosic granules to 5% or less by weight.

2. The method of claim 1 in which at least about 50%-75% of the granules are coated with the aqueous adjunct and dual adhesive/surface active agent.

3. The method of claim 1 in which the aqueous adjunct is an aqueous mixture, solution or suspension of an odor control agent and one or more of a biocide, a coloring agent, a urinase inhibitor, and a surfactant.

4. The method of claim 1 in which the amount of the aqueous adjunct is no greater than that which would bring the total moisture in the granules to 3.5% or less by weight.

5. The method of claim 1 in which the cellulosic granules are derived from primary paper sludge or a combination of primary and secondary paper sludge.

6. The method of claim 1 in which the cellulosic granules contain at least 50% cellulosic content and are from about 4 to 60 mesh in size.

7. The method of claim 1 in which the dual adhesive and surface active agent is a polyacrylate with an average molecular weight of about 2000 to 4000.

8. The method of claim 1 in which the dual adhesive/surface active agent is chosen from the group consisting of polyacrylates and acrylate copolymers.

9. The method of claim 1 in which the amount of the guar gum is about 1.5%-3% by weight based on the weight of the granules.

10. The method of claim 1 in which the amount of guar gum is at least about 1% to 4% based on the weight of the granules.

11. The method of claim 1 in which the guar gum is in the form of a powder of less than 80 mesh in size.

12. The method of claim 1 in which the cellulosic granules are agglomerated granules.

13. The method of claim 1 in which the cellulosic granules are in granular form.

14. The method of claim 1 in which the cellulosic granules are in pellet form.

15. The method of claim 1 in which the cellulosic granules contain at least 40% by weight cellulosic content.

16. A method of making a clumping cellulosic animal litter with enhanced clumping rate and improved flushability when spent comprising:
   providing a plurality of cellulosic granules;
   first applying about 1%-5% by weight based on the granules of an inner coating of a dual adhesive/surface active agent in which the dual adhesive/surface active agent is a polyacrylate or an acrylate polymer;
   second applying a coating of about 1%-4% by weight based on the weight of the granules of a guar gum substitute that provides clumping commensurate with that achieved with guar gum; and
   then applying an aqueous adjunct of an aqueous mixture, solution or suspension of an odor control agent in an amount no greater than that which will bring the total moisture of the final coated cellulosic granules to 5% or less by weight.

17. The method of claim 16 in which the guar gum substitute is one or more of carboxymethylcellulose, and an animal-safe blend of water-soluble natural gums that provide guar gum properties.

18. The method of claim 16 in which the amount of the dual adhesive/surface active agent is no greater than that which would bring the total moisture in the granules to 3.5% or less by weight.

19. The method of claim 16 in which the dual adhesive and surface active agent is a polyacrylate with an average molecular weight of about 2000 to 4000.

\* \* \* \* \*